(12) United States Patent
Kabasawa et al.

(10) Patent No.: US 6,704,260 B1
(45) Date of Patent: Mar. 9, 2004

(54) REPRODUCING METHOD AND REPRODUCING APPARATUS

(75) Inventors: Kenichi Kabasawa, Saitama (JP); Hirotomo Yunoki, Chiba (JP); Atsushi Kitamura, Tokyo (JP)

(73) Assignee: Sony Corporation, Tokyo (JP)

( * ) Notice: Subject to any disclaimer, the term of this patent is extended or adjusted under 35 U.S.C. 154(b) by 507 days.

(21) Appl. No.: 09/596,440

(22) Filed: Jun. 19, 2000

(30) Foreign Application Priority Data

Jun. 23, 1999 (JP) .......................................... P11-177154
Jun. 12, 2000 (JP) .......................................... 2000-175977

(51) Int. Cl.⁷ ................................................ G11B 5/09
(52) U.S. Cl. ................................ 369/47.32; 369/53.31; 369/59.21
(58) Field of Search ........................ 369/47.32, 47.33, 369/47.34, 47.48, 53.22, 53.26, 53.34, 53.35, 53.36, 47.28, 47.29, 47.3, 53.31, 59.11, 59.19, 59.21, 59.22

(56) References Cited

U.S. PATENT DOCUMENTS

| | | | | |
|---|---|---|---|---|
| 5,508,983 A | * | 4/1996 | Nakamura et al. | 369/47.31 |
| 5,590,101 A | * | 12/1996 | Itoi | 369/30.23 |
| 5,604,646 A | * | 2/1997 | Yamawaki | 369/53.32 |
| 5,694,383 A | * | 12/1997 | Arataki et al. | 369/47.32 |
| 6,496,456 B2 | * | 12/2002 | Ueki | 369/47.33 |
| 6,529,456 B2 | * | 3/2003 | Koudo et al. | 369/47.48 |

* cited by examiner

*Primary Examiner*—Thang V. Tran
*Assistant Examiner*—Bach Vuong
(74) *Attorney, Agent, or Firm*—Oblon, Spivak, McClelland, Maier & Neustadt, P.C.

(57) ABSTRACT

An object of this invention is to provide a reproducing method and apparatus capable of facilitating a processing operation for permitting a write into a temporal memory means by reading data from a recording medium driven at a variable driving speed, permitting the write into a temporal memory means according to a signal reproduced from the recording medium and if there is a permission for the write in a period generated at a predetermined cycle and allowing the write into the temporal memory means, writing the data read to the temporal memory means.

11 Claims, 7 Drawing Sheets

REPRODUCING METHOD AND REPRODUCING APPARATUS

BACKGROUND OF THE INVENTION

1. Field of the Invention

The present invention relates generally to a reproducing apparatus wherein data is read out from a recording medium driven at a variable driving speed and the data is memorized in a temporal memory means at a memory timing into the temporal memory generated at a predetermined cycle different from a reading timing so as to reproduce the data.

2. Description of the Related Art

According to a conventional technology, in order to prevent an interruption of reproduction of audio data due to an occurrence of discontinuity of reading, which is caused by an interruption of data reading from a recording medium because of vibration during reproduction of the audio data recorded in the recording medium, for example, a spindle motor is rotated at a higher speed than a rotation speed necessary for ordinary reproduction of the audio data so as to process data from the recording medium read by an optical pickup by means of a signal processing portion and store the data temporarily in a buffer RAM through a RAM (random access memory) controller as audio data. Consequently, the microcomputer controls so as to read audio data continuously at a predetermined speed even if discontinuity of reading occurs.

If there is a jitter between a frame synchronous signal (SCOR signal) synchronous with a clock extracted from a RF signal reproduced from a disc and a frame synchronous signal (GRSCOR signal) synchronous with crystal system clock, the microcomputer generates a XQOK signal to the memory controller with reference to the GRSCOR signal and controls start and stop of data write into the buffer RAM.

Figure 1:
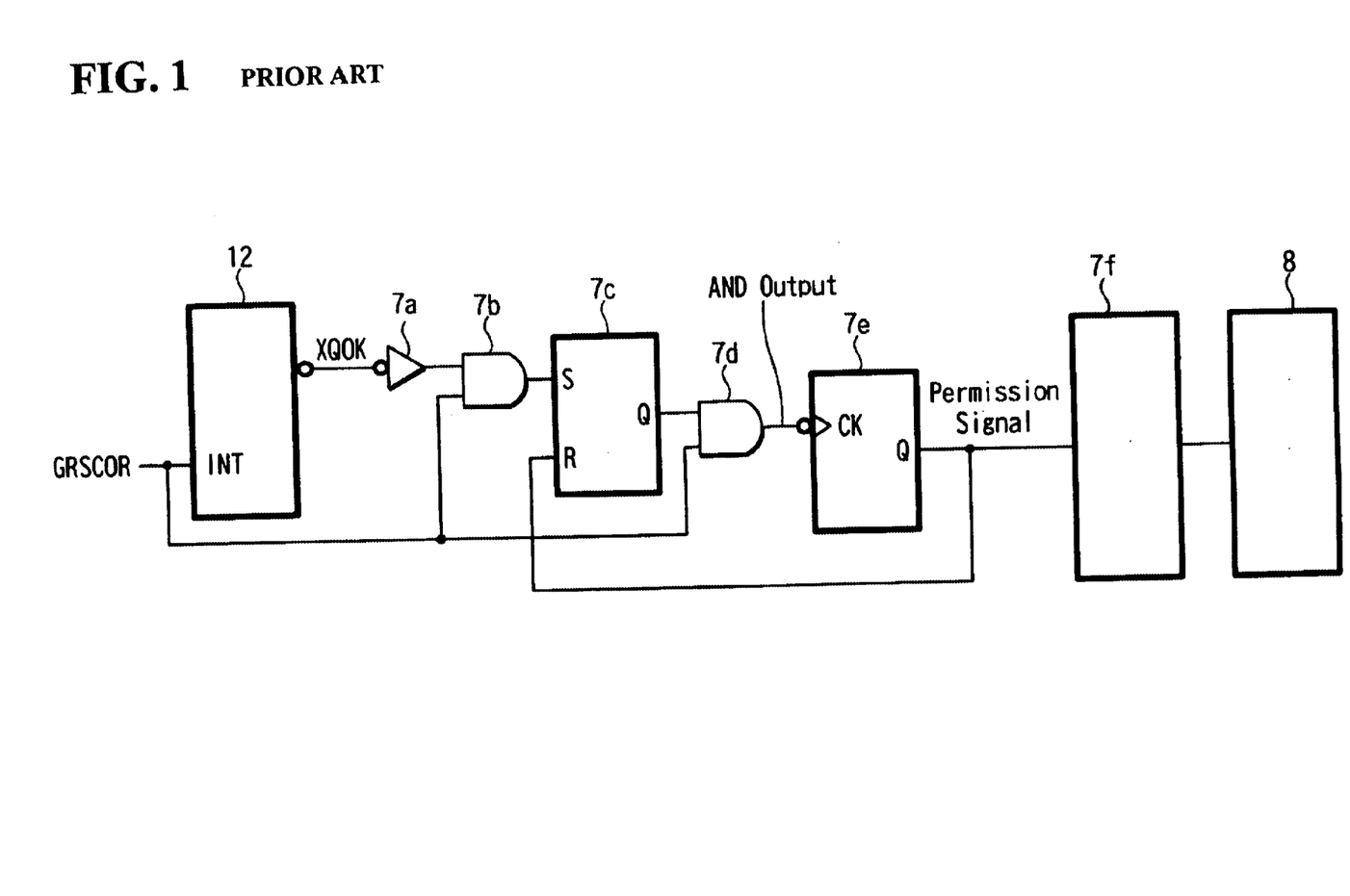
FIG. 1 shows a conventional circuit for generating a data write permission signal.
Figures 2A, 2B:
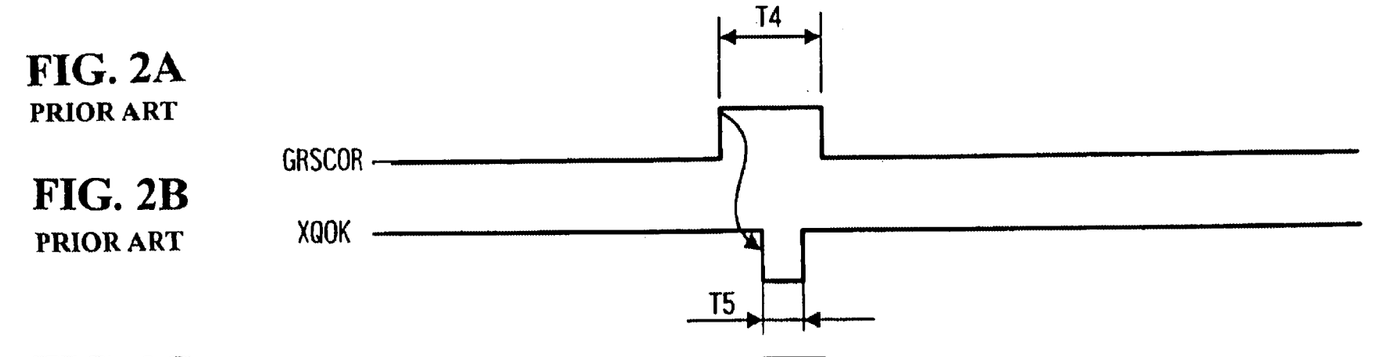
FIG. 2A shows GRSCOR signal in a conventional timing chart indicating generation of data write timing into a buffer RAM.
FIG. 2B shows XQOK signal in a conventional timing chart indicating generation of data write timing into a buffer RAM.
Figures 2C, 2D:
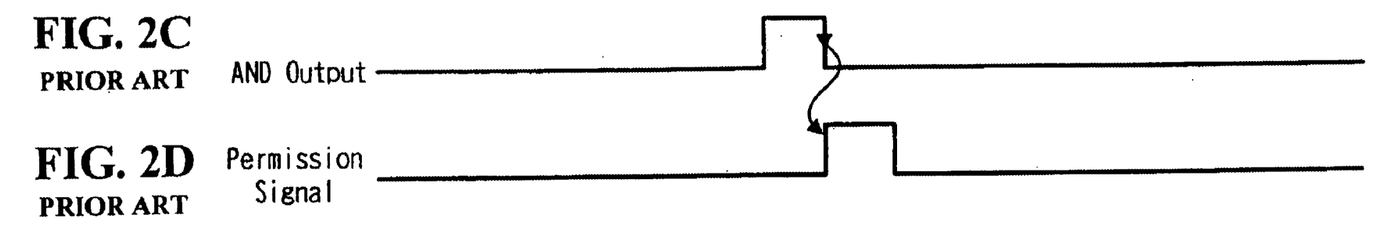
FIG. 2C shows AND output signal in a conventional timing chart indicating generation of data write timing into a buffer RAM.
FIG. 2D shows a permission signal in a conventional timing chart indicating generation of data write timing into a buffer RAM.

As shown in FIGS. 2A, 2D, the memory controller has to start control on writing into the buffer RAM with reference to a rear end of the GRSCOR signal. Thus, conventionally, a control signal for permitting data write into the buffer RAM is generated by means of a circuit shown in FIG. 1.

As shown in FIG. 1, the microcomputer 12 generates a XQOK signal for detecting that the frame synchronous signal GRSCOR synchronous with the crystal system clock to be applied to the interruption signal input terminal becomes high level. The XQOK signal is logically inverted by a NOT circuit 7a and after that, inputted to an AND circuit 7b. The AND circuit 7b obtains a logical product between the GRSCOR signal and the XQOK signal and its result is inputted to a latch circuit 7c. Then, a logical product between the output of the latch circuit 7c and the GRSCOR signal is obtained by the AND circuit 7d and inputted to a timer circuit 7e as an AND output. A permission signal for permitting a memory write control block 7f to start its operation is outputted from the timer circuit 7e and based on this permission signal, the memory write control block 7f controls data write into the buffer RAM 8. A permission signal outputted from the timer circuit 7e is inputted to a reset input terminal of the latch circuit 7c and the latch circuit 7c negates the output.

In this case, as indicated by a conventional timing chart of generation of data write timing into a buffer RAM shown in FIGS. 2A, 2B, 2C, 2D, the microcomputer is made active low only in a period T5 in such a period in which the GRSCOR signal is of high level and the microcomputer has to generate a permission signal (XQOK signal) for permitting data write into the RAM controller and send it to the RAM controller. Thus, the microcomputer is required to fetch the GRSCOR signal through an interruption processing by means of an interruption terminal and send the XQOK signal at the above described strict timing immediately.

Figure 3:
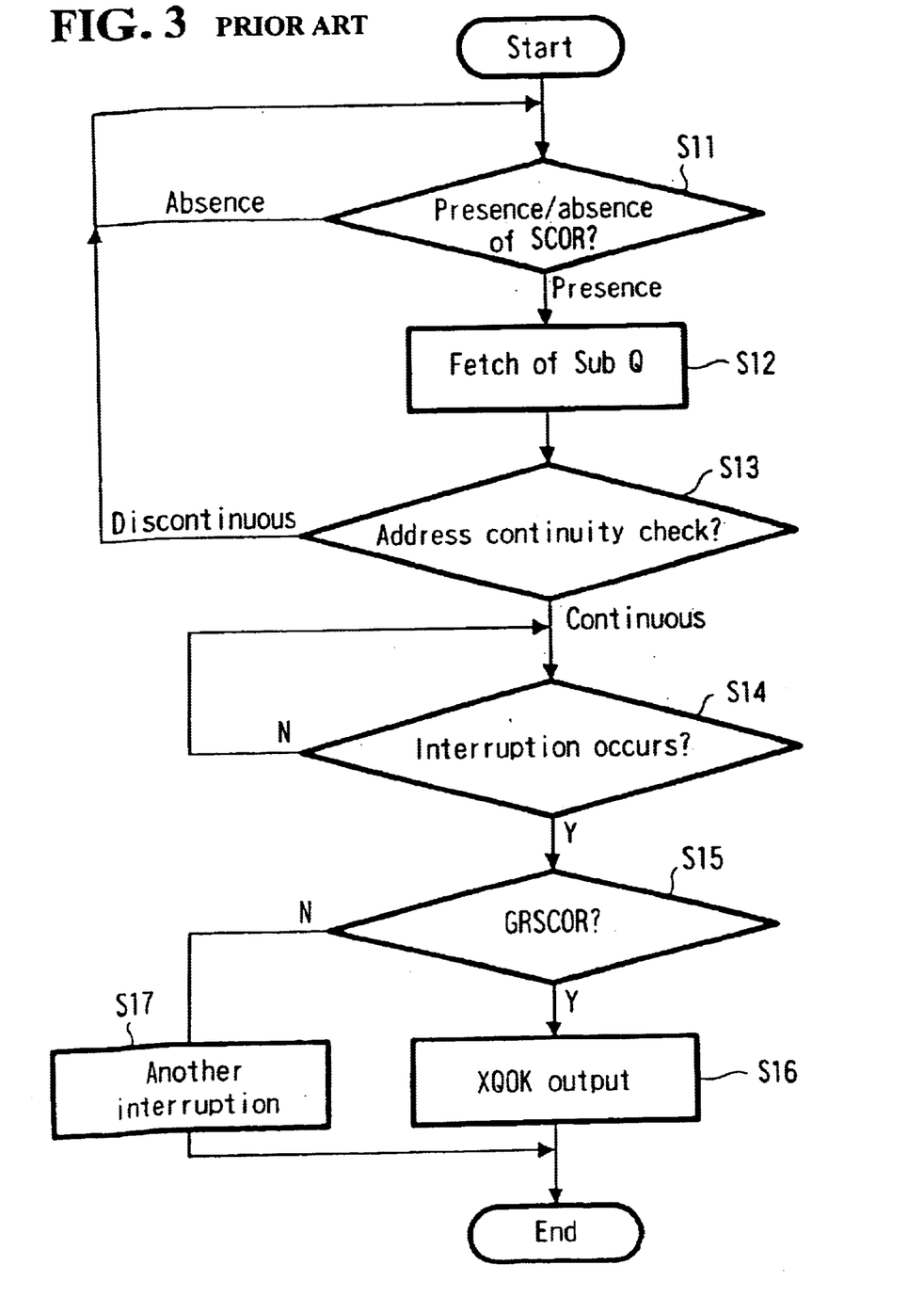
FIG. 3 is a conventional flow chart showing an operation for generating data write timing into the buffer RAM.

FIG. 3 shows a conventional flow chart of a generation of data write timing into the buffer RAM. Referring to FIG. 3, when the SCOR signal is inputted in step S11, the processing proceeds to step S12 in which data of the subcode Q is fetched from a signal processing portion. In step S13, the microcomputer checks continuity of address according to data of the fetched subcode Q. If the address is discontinuous, presence/absence of the SCOR signal is determined in step S11 and after that, fetching of data of the subcode Q in step S12 and checking of address continuity in step S13 are repeated. If the address is continuous, the processing proceeds to step S14, in which whether or not an interruption processing has occurred is determined.

If the interruption processing occurs in step S14, the processing proceeds to step S15, in which whether or not the GRSCOR signal is high level is determined. If the GRSCOR signal is high level, the processing proceeds to step S16, in which the microcomputer sends a XQOK signal for permitting data write to the RAM controller. Generation timing of the XQOK signal is shown in FIGS. 2A, 2B. If the GRSCOR signal is not high level in step S15, the processing proceeds to step S17, in which another interruption processing is carried out.

As described above, in a conventional technology for preventing an interruption of reproduction of audio data because of discontinuity of reading, which is caused by an interruption of data reading from a recording medium due to vibration applied to the apparatus, such a timing that the microcomputer is capable of sending the XQOK signal for permitting data write into the RAM controller is strictly restricted. Therefore, the microcomputer requires an interruption port for interruption processing and there is some limitation on its software which may affect other processings.

Accordingly, the present invention has been achieved in views of the above described problems, and therefore, an object of the invention is to provide a reproducing apparatus for preventing an interruption of reproduction of audio data, in which the microcomputer smoothes timing generation of a permission signal for permitting data write into a RAM controller.

SUMMARY OF THE INVENTION

To achieve the above object, according to an object of the present invention, there is provided a reproducing method in which data is read from a recording medium driven at a variable driving speed and stored in a temporal memory means for reproduction, comprising the steps of: detecting a readable signal indicating a timing capable of reading data from the recording medium generated from a signal reproduced from the recording medium; determining continuity of data read when the readable signal is detected; and outputting a permission signal for permitting the data to be written into the temporal memory means promptly if it is determined that the read data has continuity.

Further according to another aspect of the present invention, there is provided a reproducing apparatus for reading data from a recording medium driven at a variable driving speed and reproducing the data, comprising: a detecting means for detecting a readable signal indicating a timing capable of reading data from the recording medium generated from a signal reproduced from the recording medium; a determining means for determining continuity of data read when the readable signal is detected; and a temporal memory means for memorizing data read from the recording medium temporarily; and a permission signal output means for outputting a permission signal for permitting the data to be written into the temporal memory means promptly if it is determined that the read data has continuity.

DETAILED DESCRIPTION OF THE PREFERRED EMBODIMENTS

Figure 4:
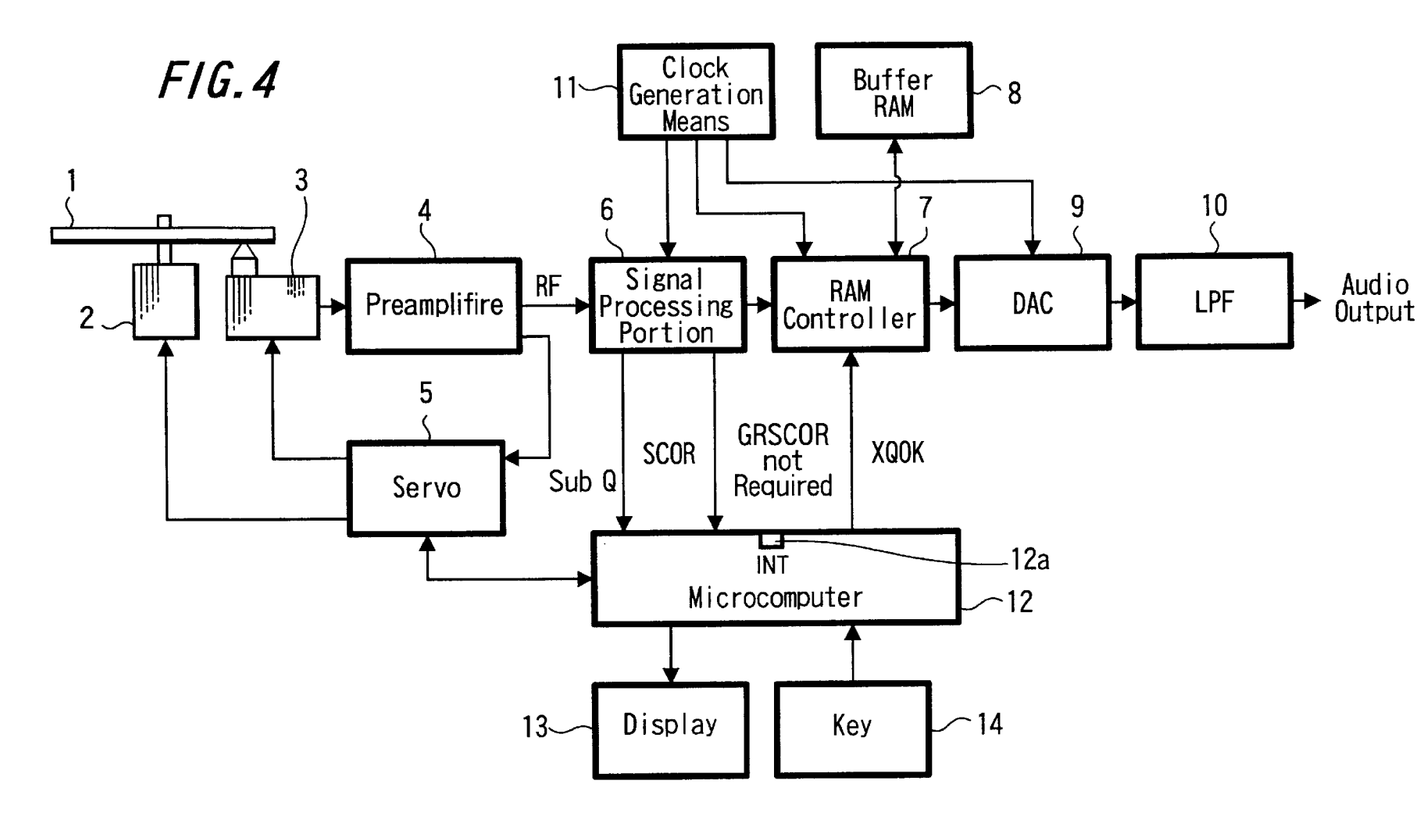
FIG. 4 is a block diagram showing a structure of a data reproducing apparatus of an embodiment of the present invention.

Hereinafter, a data reproducing apparatus of the embodiment of the present invention will be described in detail with reference to the accompanying drawings. FIG. 4 is a block diagram showing a structure of the data reproducing apparatus of this embodiment.

The data reproducing apparatus of this embodiment comprises: an optical disc 1 on which audio data is recorded; a spindle motor 2 for rotating the optical disc 1, an optical pickup 3 for irradiating the optical disc 1 with laser beam for reproduction; a preamplifier 4 which detects a reflection light from the optical disc 1 of laser beam projected by the optical pickup 3 and generates RF signal, focus servo signal, tracking servo signal and spindle servo signal by amplifying the reflection signal by addition or subtraction so as to enable signal processing of subsequent stages; and a servo circuit 5 for driving a focus coil and tracking coil of a two-axis actuator in the optical pickup 3 based on the focus servo signal, tracking servo signal and spindle servo signal generated by the preamplifier 4 so as to drive the spindle motor 2.

Further, the data reproducing apparatus of this embodiment comprises a signal processing portion 6 for extracting a clock from a RF signal generated by the preamplifier 4 and carrying out such processings as EFM (8–14 modulation) decoding, error correction, interpolation and subcode decoding and the like on the RF signal, a RAM controller 7 for controlling a write or read of data subjected to signal processing by the signal processing portion 6 to/from the buffer RAM 8, a buffer RAM 8 for use in storing data reproduced rapidly temporarily and reading out at a predetermined rate, a DAC (D/A converter) 9 for converting data read from the buffer RAM 8 to analog signal and LPF (Lowpass Filter) 10 for fetching out only a predetermined frequency region from the converted analog signal.

Further, the data reproducing apparatus of this embodiment comprises a clock generating means 11 for generating a clock by means of an oscillator such as crystal having a predetermined frequency and supplying a clock signal to the signal processing portion 6, RAM controller 7, and DAC 9, a microcomputer 12 for supplying a control signal to the servo circuit 5, signal processing portion 6 and RAM controller 7 so as to control the operations thereof, a display portion 13 for displaying an operation mode, reproduction track number and the like, and a key 14 capable of inputting an operation instruction and the like.

The signal processing portion 6 fetches out a subcode Q from the RF signal by a predetermined signal demodulation processing and supplies it to the microcomputer 12. The signal processing portion 6 generates a frame synchronous signal SCOR signal synchronous with a clock extracted from a reproduction RF signal by means of PLL (phase locked loop) circuit and supplies it to the microcomputer 12 and generates a frame synchronous signal GRSCOR signal synchronous with crystal system clock. The microcomputer 12 sends a permission signal XQOK signal for permission of data write into the buffer RAM 8 to the RAM controller 7.

The optical pickup 3 forms a reproducing means for playing back a disc on which digital signal including synchronous signal and address information is recorded.

The PLL circuit of the signal processing portion 6 forms an extracting means for extracting a synchronous signal from digital signal reproduced by the optical pickup 3.

The signal processing portion 6 forms a signal processing means for decoding a digital signal reproduced by the optical pickup 3.

Further, the clock generating means 11 forms a clock generating means for generating any frequency.

The signal processing portion 6 forms a synchronous signal generating means for generating a synchronous signal GRSCOR based on any clock generated by the clock generating means 11.

The buffer RAM 8 forms a memory means for storing a digital signal outputted from the signal processing portion 6 temporarily.

The microcomputer 12 forms a detecting means for fetching in address information (sub code Q) contained in digital signal decoded by the signal processing portion 6 based on synchronous signal SCOR extracted by the PLL circuit of the signal processing portion 6 so as to detect continuity.

The microcomputer 12 generates a permission signal XQOK signal for permitting a fetch of a digital signal outputted from the signal processing portion 6 into the buffer RAM 8 if the microcomputer 12 recognizes continuity of address information (subcode Q) in a period from a timing of obtaining synchronous signal SCOR extracted by the PLL circuit of the signal processing portion 6 up to a timing of obtaining synchronous signal GRSCOR generated by the signal processing portion 6.

Figure 5:
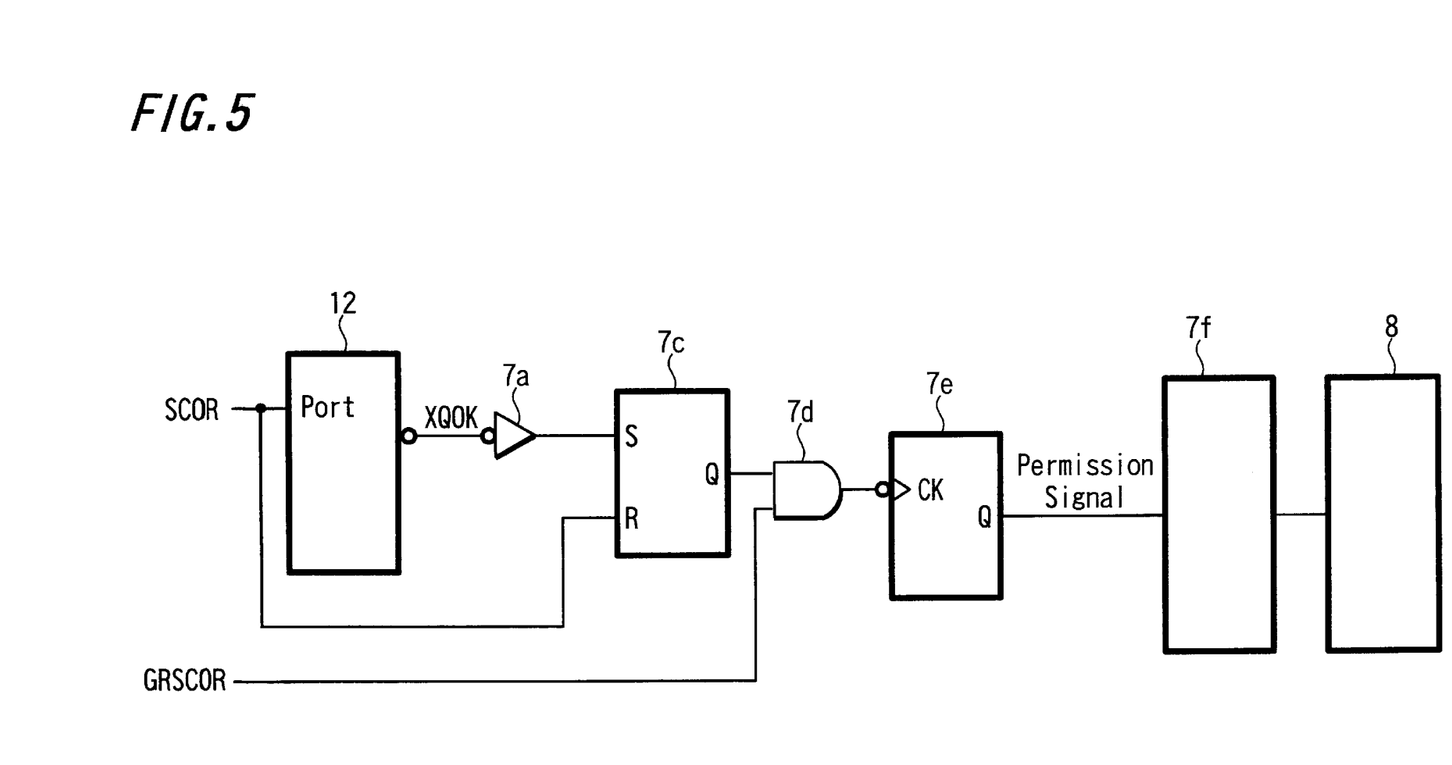
FIG. 5 is a diagram of a permission signal generating circuit of the embodiment of the present invention.

FIG. 5 shows portions which are elements of the present invention in the embodiment shown in FIG. 4.

A NOT circuit 7a, latch circuit 7c, AND circuit 7d, timer circuit 7e and memory write control block 7f are part of the RAM controller 7 shown in FIG. 4 while the other circuits correspond to circuits having corresponding numbers of FIG. 4.

An operation of the reproducing apparatus of the embodiment having such a structure will be described below. Referring to FIG. 4, a signal recorded in the optical disc 1 is read out by irradiating with laser beam from the optical pickup 3, and passed through the preamplifier 4 so as to obtain so-called RF signal. The RF signal is subjected to such processings as EFM decoding, error correction, interpolation and subcode decoding by the signal processing portion 6 and then, audio data output which is a main data thereof is stored in the buffer RAM 8 through the RAM controller 7.

As for data transmission rate, reproduced audio data is written into the buffer RAM 8 at a higher rate than a final reproduction output by controlling a rotation of the spindle motor 2 according to a drive signal from the servo circuit 5, for example, by means of a variable rotation means for rotating the disc 1 at a higher speed than normal rotation.

Audio data stored in the buffer RAM 8 is read out at a normal reproduction rate by the RAM controller 7 and converted to analog signal by the DAC 9. Then, by fetching only a predetermined frequency region by means of the LPF 10, the analog signal is outputted as audio signal.

Here, if the servo system is disturbed by a disturbance for example, that is, first if the focus servo by the optical pickup 3 is canceled, second if subcode Q fetched from the RF signal becomes discontinuous in signal demodulation processing of the signal processing portion 6, third if the PLL circuit of the signal processing portion 6 is not stabilized more than a predetermined time, or fourth if a flag for interpolation of the signal processing portion 6 is risen, the microcomputer 12 monitors each condition. Then, the microcomputer 12 controls to interrupt write of audio data into the buffer RAM 8 by the RAM controller 7.

Then, after the servo system is recovered, the microcomputer 12 accesses an audio data write address on the buffer RAM 8 just before a reproduction signal is interrupted through the RAM controller 7 so as to restart write from that point.

Consequently, if the audio data stored in the buffer RAM 8 is not made empty, a continuous reproduction output can be obtained of course, in this case, if the audio data stored in the buffer RAM 8 becomes full, the microcomputer 12 needs to interrupt write of the audio data into the RAM controller 7 so as to enter into pose operation.

However, although the RF signal to be inputted into the signal processing portion 6 is synchronous with the PLL system clock containing an unevenness of rotation of the disc 1 and the like, because main data to be outputted to the RAM controller 7 is synchronous with crystal system clock, jitter exists between the both. If a timing of restarting data write into the buffer RAM 8 is dependent of address of subcode Q, data loss or overlapping due to connection error occurs.

To prevent this phenomenon, frame synchronous signal GRSCOR signal synchronous with crystal system clock is produced as well as frame synchronous signal SCOR signal synchronous with PLL system clock and based on this, the microcomputer 12 controls start and stop of data write into the buffer RAM 8 by the RAM controller 7.

Here, FIGS. 6A, 6B, 6C, 6D, 6E, 6F, 6G show a timing chart for generation of data write timing into the buffer RAM of this embodiment. The microcomputer 12 checks the subcode Q shown in FIG. 6B. If it is determined that data continuity is not disturbed by checking the subcode Q, the microcomputer 12 sends a data write permission signal XQOK signal (FIG. 6C) into the buffer RAM 8 by means of the RAM controller 7. That timing has only to be after the SCOR signal shown in FIG. 6A becomes high level and within T1 before such a timing that the GRSCOR signal shown in FIG. 6E becomes high level earliest when considering a jitter between the GRSCOR signal and SCOR signal shown in FIG. 6A.

Figure 6A:
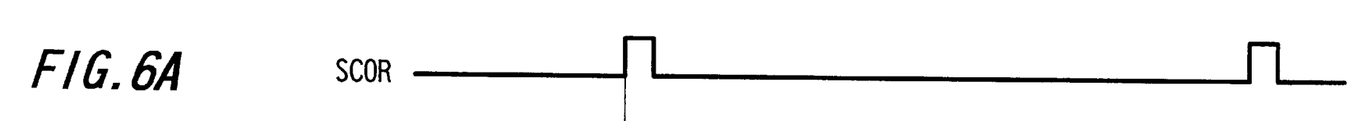
FIG. 6A shows SCOR signal in a timing chart indicating generation of data write timing into the buffer RAM of the embodiment of the present invention.
Figure 6B:
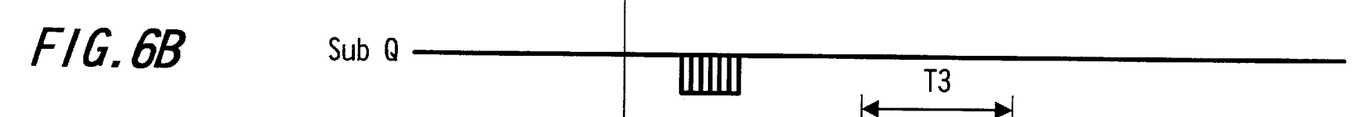
FIG. 6B shows SUB Q signal in a timing chart indicating generation of data write timing into the buffer RAM of the embodiment of the present invention.
Figure 6C:
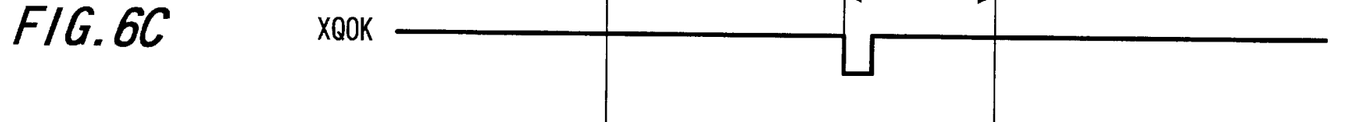
FIG. 6C shows XQOK signal in a timing chart indicating generation of data write timing into the buffer RAM of the embodiment of the present invention.
Figure 6D:
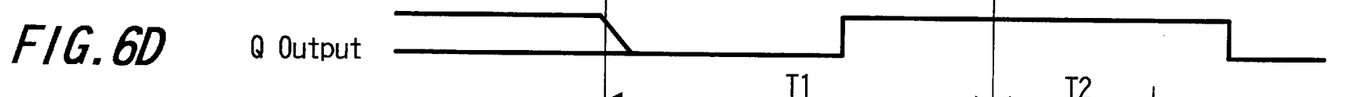
FIG. 6D shows Q output signal in a timing chart indicating generation of data write timing into the buffer RAM of the embodiment of the present invention.
Figure 6E:
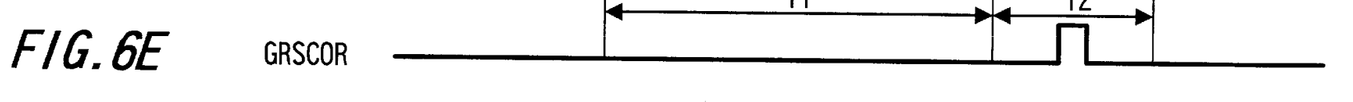
FIG. 6E shows GRSCOR signal in a timing chart indicating generation of data write timing into the buffer RAM of the embodiment of the present invention.
Figure 6F:
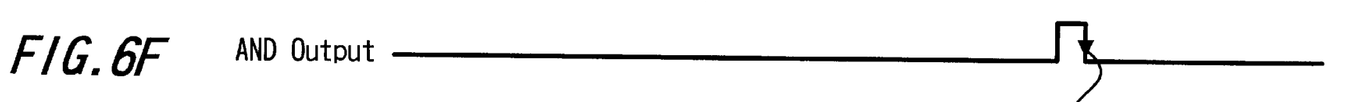
FIG. 6F shows AND output signal in a timing chart indicating generation of data write timing into the buffer RAM of the embodiment of the present invention.
Figure 6G:
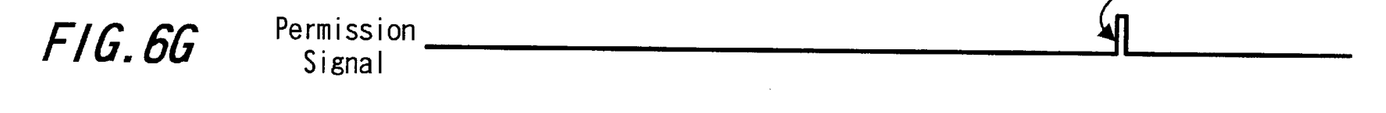
FIG. 6G shows a permission signal in a timing chart indicating generation of data write timing into the buffer RAM of the embodiment of the present invention.

If a width of jitter between the SCOR signal shown in FIG. 6A and the GRSCOR signal shown in FIG. 6E is assumed to be T2, T1 becomes (T3>0) at any timing before T2.

Thus, the microcomputer 12 has only to send a permission signal XQOK signal at any timing after the processing of the subcode Q is finished, without fetching the GRSCOR signal or monitoring. Therefore, the microcomputer 12 does not require an interruption terminal 12a (INT) and does not have to take in the GRSCOR signal by interruption processing or send the XQOK signal at a strict timing.

As for the GRSCOR signal timing, the microcomputer 12 recognizes respective conditions by setting processing conditions or a predetermined sampling of output data from the signal processing portion 6 so as to recognize timings of T1, T2 and T3 easily.

A further detailed operation will be described with reference to FIG. 5.

A SCOR signal is inputted to an input port of the microcomputer 12 and the microcomputer 12 evaluates the subcode Q according to the SCOR signal. If the continuity of address is confirmed, the XQOK signal is outputted.

A XQOK signal outputted by the microcomputer 12 is inverted by the NOT circuit 7a and the XQOK signal is latched as set input into a latch 7c.

If the XQOK signal is latched by the latch 7c, Q output of the latch 7c is asserted so that a gate for the GRSCOR signal of the AND circuit 7d is opened.

If the GRSCOR signal is asserted while the gate for the GRSCOR signal is open, the timer 7e outputs a permission signal from Q output from a rear edge of the GRSCOR signal in a predetermined period.

Further, the latch 7c is reset by next SCOR signal so that the gate for the GRSCOR signal is closed. Then, the same operation is continued after that.

Figure 7:
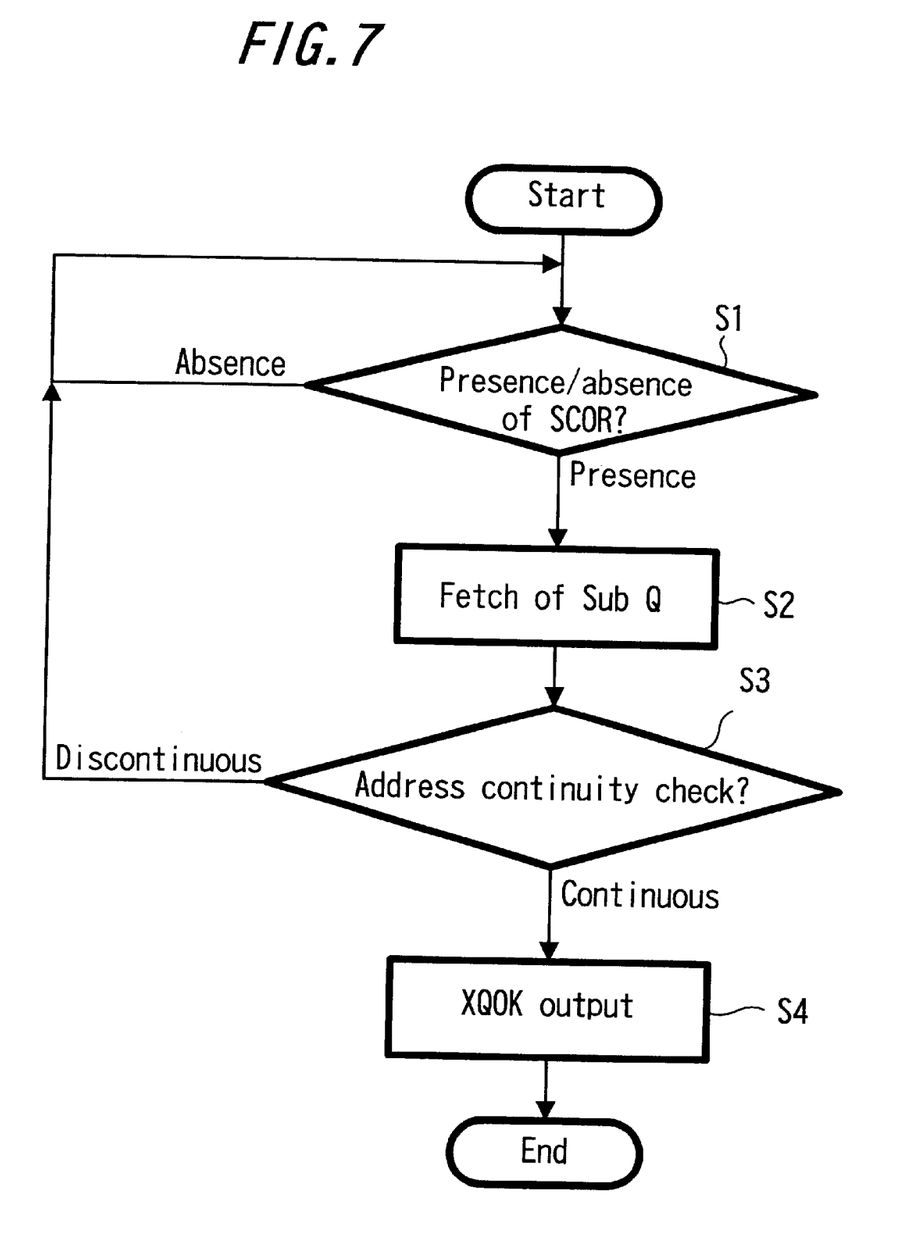
FIG. 7 is a flow chart showing an operation for generating a data write timing into the buffer RAM of the embodiment of the present invention.

FIG. 7 shows a flow chart of operation for generating a timing for data write into the buffer RAM of this embodiment. If SCOR signal is inputted in step S1 of FIG. 7, the processing proceeds to step S2 in which the microcomputer 12 fetches data of the subcode Q form the signal processing portion 6. In step S3, the microcomputer 12 checks continuity of address according to data of the subcode Q. If the address is discontinuous, presence/absence of the SCOR signal is determined in step S1 and after that, data of the subcode Q is fetched in step S2. In step S3, address continuity check is repeated and if the address is continuous, the processing proceeds to step S4, in which the microcomputer 12 sends XQOK signal for permitting the RAM controller 7 to write data. The timing for generation of the XQOK signal is shown in FIGS. 6A, 6B, 6C.

The reproducing apparatus of this embodiment comprises the optical pickup 3 which is a reproducing means for playing back a disc in which digital signal containing synchronous signal and address information is recorded, the PLL circuit of the signal processing portion 6 which is an extracting means for extracting synchronous signal SCOR from digital signal reproduced by the optical pickup 3, the signal processing portion 6 which is a signal processing means for decoding digital signal reproduced by the optical pickup 3, the clock generating means 11 which is a clock generating means for generating any frequency, the signal processing portion 6 which is a synchronous signal generating means for generating the synchronous signal GRSCOR based on any clock generated by the clock generating means 11, the buffer RAM 8 which is a memory means for storing digital signal outputted from the signal processing portion 6 temporarily, and the microcomputer 12 which is a detecting means for fetching address information (subcode Q) contained in digital signal decoded by the signal processing portion 6 so as to detect continuity based on the synchronous signal SCOR extracted by the PLL circuit of the signal processing portion 6. If continuity of the address information (subcode Q) can be recognized by the microcomputer 12 in period T1 from a timing in which the synchronous signal SCOR extracted by the PLL circuit of the signal processing portion 6 to a timing in which the synchronous signal GRSCOR generated by the signal processing portion 6 is obtained, a permission signal XQOK for permitting a fetch of digital signal outputted from the signal processing portion 6 into the buffer RAM 8 is generated, so that the freedom of the timing for generating the permission signal XQOK can be expanded. Further, because timing control of the permission signal is made smooth, the interruption processing becomes unnecessary, so that the structure and processing can be simplified.

Further, as described above, the reproducing apparatus of this embodiment generates the permission signal XQOK if a jitter width exists between the synchronous signal SCOR extracted by the PLL circuit of the signal processing portion 6 and the synchronous signal GRSCOR generated by the signal processing portion 6. Thus, even if a width for absorbing the jitter by means of the buffer RAM 8 is considered, the timing control of the permission signal can be made smooth.

Because as described above, the reproducing apparatus of this embodiment generates the permission signal XQOK when no jitter exists between the synchronous signal SCOR extracted by the PLL circuit of the signal processing portion 6 and the synchronous signal GRSCOR generated by the signal processing portion 6, the signal processing portion 6 is operated according to not the clock signal supplied by the clock generating means 11 but the clock signal extracted by the PLL circuit. Thus, if the synchronous signal SCOR extracted by the PLL circuit of the signal processing portion 6 is synchronous with the synchronous signal GRSCOR generated by the signal processing portion 6, the timing control of the permission signal can be made smooth.

Although a case in which the optical disc 1 is CD (compact disc) has been described in this embodiment described above, it may be other optical disc, for example, mini disc (MD), digital versatile disc (DVD), rewritable CD-RW, or photomagnetic disc (MO).

The reproducing apparatus of the present invention comprises the reproducing means for playing back a disc in which digital signal containing synchronous signal and address information is recorded, the extracting means for extracting synchronous signal from digital signal reproduced by the reproducing means, the signal processing means for decoding digital signal reproduced by the reproducing means, the clock generating means for generating any frequency, the synchronous signal generating means for generating the synchronous signal based on any clock generated by the clock generating means, the memory means for storing digital signal outputted from the signal processing means temporarily, and the detecting means for fetching address information contained in digital signal decoded by the signal processing means so as to detect continuity. If continuity of the address information can be recognized by the detecting means in period from a timing in which the synchronous signal extracted by the extracting means to a timing in which the synchronous signal generated by the synchronous signal generating means is obtained, a permission signal for permitting a fetch of digital signal outputted from the signal processing means into the memory means is generated, so that the freedom of the timing for generating the permission signal can be expanded. Further, because timing control of the permission signal is made smooth, the interruption processing becomes unnecessary, so that the structure and processing can be simplified.

Because as described above, the reproducing apparatus of the present invention generates a permission signal if a jitter exists between the synchronous signal extracted by the extracting means and the synchronous signal generated by the synchronous signal generating means, there is such an effect that the timing control of the permission signal can be made smooth even if a width for absorbing the jitter by the memory means is considered.

Because as described above, the reproducing apparatus of the present invention generates a permission signal if no jitter exists between the synchronous signal extracted by the extracting means and the synchronous signal generated by the extracting means, even if the signal processing means is operated according to the clock signal extracted by the extracting means and the synchronous signal extracted by the extracting means is synchronous with the synchronous signal generated by the synchronous signal generating means, there is another effect that the timing control of the permission signal can be made smooth.

Having described preferred embodiments of the invention with reference to the accompanying drawings, it is to be understood that the invention is not limited to those precise embodiments and that various changes and modifications could be effected therein by one skilled in the art without departing from the spirit or scope of the invention as defined in the appended claims.

What is claimed is:

1. A reproducing method in which data is read from a variable speed reproducible recording medium and stored in a temporal memory for reproduction, comprising the steps of:

detecting a synchronous signal reproduced from said recording medium;

judging a continuity of data read when said synchronous signal is detected; and outputting a first permission signal for permitting said data to be written into said temporal memory if it is judged that the read data has continuity;

wherein the first permission signal is output after the synchronous signal is detected and within a predetermined time period before a synchronous system clock is generated.

2. The reproducing method according to claim 1, wherein the reproduction is carried out asynchronously with a step of reading the data written into said temporal memory from said recording medium and writing into said temporal memory.

3. The reproducing method according to claim 1, further comprising the steps of:

while holding the first permission signal, obtaining a logical product between the held signal and a write synchronous signal indicating a timing in which data can be written into said temporal memory; and outputting a second permission signal for permitting an operation for writing data into said temporal memory in a predetermined period from an end point of the signal whose logical product is obtained.

4. A reproducing apparatus for reading data from a variable speed reproducible recording medium and reproducing the data, comprising:

a detecting means for detecting a synchronous signal reproduced from said recording medium;

a judging means for judging whether or not data read from said recording medium has continuity when said synchronous signal is detected; and a temporal memory means for storing data read from said recording medium temporarily; and a first permission signal output means for outputting a first permission signal for permitting said data to be written into said temporal memory means without any interruption processing if it is judged that the read data has continuity;

wherein the first permission signal is output after the synchronous signal is detected and within a predetermined time period before a synchronous system clock is generated.

5. The reproducing apparatus according to claim 4, further comprising:

a memory control means for, reading data from said temporal memory means asynchronously with said data write so as to reproduce data read from said temporal memory means while writing data read from said recording medium into said temporal memory means according to the first permission signal outputted by said first permission signal output means.

6. The reproducing apparatus according to claim 4, wherein the memory control means comprises:

a holding means for holding the first permission signal;

a logical product obtaining means for obtaining a logical product between the signal held by said holding means and a write synchronous signal indicating a timing in which data can be written into said temporal memory means; and a second permission signal output means for outputting a second permission signal for permitting an operation for writing data into said temporal memory means in a predetermined period after an end of a signal outputted by said logical product obtaining means.

7. A reproducing method in which data is read from a variable speed reproducible recording medium and stored in a temporal memory for reproduction, comprising the steps of:

detecting a synchronous signal reproduced from said recording medium;

judging a continuity of data read when said synchronous signal is detected;

outputting a first permission signal for permitting said data to be written into said temporal memory promptly if it is judged that the read data has continuity;

while holding the first permission signal, obtaining a logical product between the held signal and a write signal indicating a timing in which data can be written into said temporal memory; and outputting a second permission signal for permitting an operation for writing data into said temporal memory in a predetermined period from an end point of the signal whose logical product is obtained.

8. The reproducing method according to claim 7, wherein the reproduction is carried out asynchronously with a step of reading the data written into said temporal memory from said recording medium and writing into said temporal memory.

9. A reproducing apparatus for reading data from a variable speed reproducible recording medium and reproducing the data, comprising:

a detecting means for detecting a synchronous signal reproduced from said recording medium;

a judging means for judging whether or not data read from said recording medium has continuity when said synchronous signal is detected;

a temporal memory means for storing data read from said recording medium temporarily;

a first permission signal output means for outputting a first permission signal for permitting said data to be written into said temporal memory means promptly without any interruption processing if it is judged that the read data has continuity; and a memory control means for reading data from said temporal memory means asynchronously with said data write so as to reproduce data read from said temporal memory means while writing data read from said recording medium into said temporal memory means according to the first permission signal outputted by said first permission signal output means, wherein the memory control means comprises:

a holding means for holding the first permission signal, a logical product obtaining means for obtaining a logical product between the signal held by said holding means and a write synchronous signal indicating a timing in which data can be written into said temporal memory means, and a second permission signal output means for outputting a second permission signal for permitting an operation for writing data into said temporal memory means in a predetermined period after an end of a signal outputted by said logical product obtaining means.

10. A reproducing apparatus for reading data from a variable speed reproducible recording medium and reproducing the data, comprising:

a detecting unit configured to detect a synchronous signal reproduced from said recording medium;

a judging unit configured to judge whether or not data read from said recording medium has continuity when said synchronous signal is detected;

a temporal memory configured to store data read from said recording medium temporarily;

a first permission signal output unit configured to output a first permission signal for permitting said data to be written into said memory promptly without any interruption processing if it is judged that the read data has continuity; and a memory control unit configured to read data from said memory asynchronously with said data write so as to reproduce data read from said memory while writing data read from said recording medium into said memory according to the first permission signal outputted by said first permission signal output unit, wherein the memory control unit comprises:
  a holding unit configured to hold the first permission signal,
  a logical product obtaining unit configured to obtain a logical product between the signal held by said holding unit and a write synchronous signal indicating a timing in which data can be written into said memory, and
  a second permission signal output unit configured to output a second permission signal for permitting an operation for writing data into said memory in a predetermined period after an end of a signal outputted by said logical product obtaining unit.

11. A reproducing apparatus for reading data from a variable speed reproducible recording medium and reproducing the data, comprising:

a detecting unit configured to detect a synchronous signal reproduced from said recording medium;

a judging unit configured to judge whether or not data read from said recording medium has continuity when said synchronous signal is detected;

a memory configured to store data read from said recording medium temporarily; and a first permission signal output unit configured to output a first permission signal for permitting said data to be written into said memory without any interruption processing if it is judged that the read data has continuity;

wherein the first permission signal is output after the synchronous signal is detected and within a predetermined time period before a synchronous system clock is generated.

* * * * *